July 17, 1928.
A. B. MERRILL
1,677,360
COMPOSITE PRODUCT AND METHOD OF MAKING SAME
Filed June 13, 1927
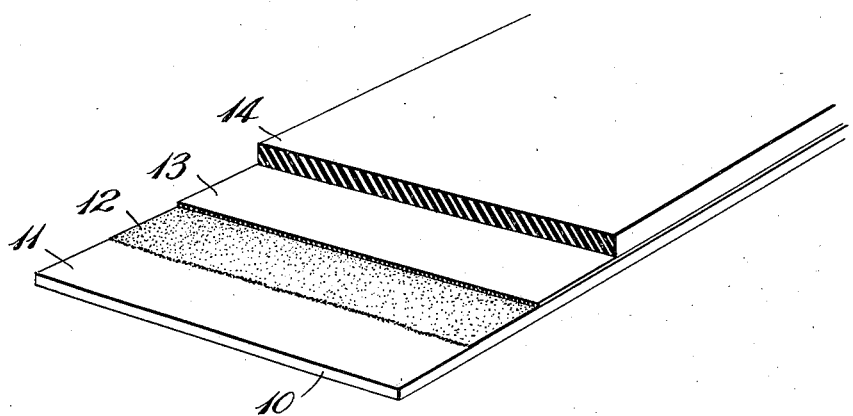
Inventor
Allan B. Merrill
By Pierson, Eakin + Avery
Attys.

Patented July 17, 1928.

1,677,360

UNITED STATES PATENT OFFICE.

ALLAN B. MERRILL, OF AKRON, OHIO, ASSIGNOR TO THE B. F. GOODRICH COMPANY, OF NEW YORK, N. Y., A CORPORATION OF NEW YORK.

COMPOSITE PRODUCT AND METHOD OF MAKING SAME.

Application filed June 13, 1927. Serial No. 198,694.

This invention relates to the art of manufacturing composite articles composed of rubber and metal and particularly to a method of universal adaptability for bonding vulcanizable rubber compositions to metals through the intermediary of isomers of rubber, and to the products of such methods.

Composite articles have heretofore been constructed by applying to a metal body a coating or layer of an isomer of rubber, superposing a vulcanizable rubber composition thereon, and then subjecting the assemblage to heat and pressure to vulcanize the rubber composition and to unite the component parts of the article into an integral whole. In carrying out the process, I find that the sulfur of the vulcanizable rubber composition migrates at vulcanization temperatures from the rubber composition through the rubber isomer and chemically reacts with certain metals, such as copper, nickel, and certain alloys thereof, to form a surface layer of metallic sulfide, which in some instances tends to weaken the bond between the rubber and the metal.

The purpose of this invention is to overcome the above mentioned difficulties and to provide a method for obtaining a firm and strong bonding of rubber to metal which shall be applicable to all metals irrespective of whether or not they react with sulfur at vulcanization temperatures to form a sulfide of the metal. This result is accomplished by checking the migratory movements of the sulfur from the vulcanizable rubber composition before the migrating sulfur reaches the surface of the metal, preferably by interposing between the vulcanizable rubber composition and the rubber isomer film a barrier layer within which the migrating sulfur is stopped and not permitted to pass therethrough to the metal. The barrier layer may be of any suitable composition capable of accomplishing this result.

In the accompanying drawing, the figure represents a rubber covered metal plate constructed in accordance with the herein described process.

In carrying out this process, it is desirable that the surface of the metal article, a plate 10 being shown, to which the rubber is to be bonded should be free of any foreign material and also of corrosion. The cleansing of the surface may be effected by sandblasting, grinding, or otherwise abrading the surface, or by treating with chemicals and washing.

The cleansed surface 11 is coated with a continuous film 12 of a heat-plastic rubber insomer, example of which are described more fully hereinafter. The rubber isomer may be spread on the metal in the form of a solution or dispersion in an organic solvent, such as gasoline or benzol, or may be applied in the form of a thin sheet.

The sulfur-barrier layer 13 may now be applied to the rubber isomer coated metal. Preferably, I employ a calendered sheet of a non-sulfur containing rubber composition, which may be admixed with fillers and pigments commonly employed in rubber compounding and, if desired, also ingredients which will react with and bind the sulfur migrating thereinto. For the latter purpose zinc oxide and any of the well known accelerators may be used, it being understood, however, that a layer of rubber without other ingredients serves satisfactorily for the purposes of this invention. Alternatively, the layer 13 may be of non-sulfur containing gutta percha, balata, and the like.

A vulcanizable rubber covering 14, may now be applied to the barrier layer 13. This covering may be of any suitable sulfur-containing rubber composition and of any desired thickness. The assembled rubber covered metal article is now ready for vulcanization of the rubber composition, which may be carried out by any of the well-known processes, preferably by subjecting to heat and pressure for such times and temperatures as shall be necessary to give a desired cure.

During vulcanization, the sulfur in the vulcanizable rubber covering 14 will to some extent migrate into the barrier layer 13, which being free of sulfur, the rubber therein will combine with the migrating sulfur and thus prevent its further migratory movements. Sulfur may also combine with other ingredients of the rubber composition. It has also been observed that finely divided or flaked solid materials in the barrier composition, even though not chemically combining with the sulfur, act as physical barriers which interrupt the progress of the migrating sulfur. The practical result in any case is that the sulfur does not penetrate through the rubber isomer film to the metal, as is shown by the bright metallic surface after vulcanization, and hence no sulfide film, which would tend to weaken the bond, is formed on the metal surface.

For the bonding film 12, I preferably employ heat-plastic rubber isomers which have the same carbon-hydrogen ratio as rubber but a less chemical unsaturation than rubber. These heat-plastic rubber isomers may be prepared in a variety of ways by the reaction on rubber of a large number of different isomerizing reagents for rubber.

In making one of the preferred heat-plastics, I mix 7½ parts by weight of phenol sulfonic acid into 100 parts of rubber and heat the resultant mix in open heat for from 6 to 12 hours at 110° C. to 140° C. The resulting product is a tough, tacky, heat-plastic solid which may be dissolved or dispersed in organic solvents. The product contains certain impurities, including those of the rubber from which it was made, either in their original or a changed form, and some residual acid. When these impurities are removed, analysis shows the product to contain carbon and hydrogen in the same ratio as rubber and to have a less chemical unsaturation than rubber.

Similar heat-plastics are made by heating under like conditions a mixture of rubber and other sulfonic acids, sulfonyl chlorides, chlorides, bromides and iodides of amphoteric metals, amphoteric metallic salts of sulfonic acids, dialkyl sulfates, sulfuric acid, and other isomerizing agents for rubber.

In using any one of these heat-plastic rubber isomers, I may mix with it substances adapted to impart to it better spreading properties, such blowing agents as tung oil, castor oil, mineral rubber, etc., being satisfactory, and I may add other pigments and preservatives following well-known compounding practices. It is to be understood that where the term "heat-plastic rubber isomer" is herein employed it is intended to embrace all materials having a main constituent composed of carbon and hydrogen in the same ratio as rubber and having a less chemical unsaturation than rubber, whether purified or impure, and whether admixed with other ingredients or not, and however prepared.

I claim:
1. In the art of making composite products of rubber and metal, the process which comprises coating the metal with a tough heat plastic isomer of rubber, superposing a sulfur-containing rubber composition on the coated metal with an intervening barrier layer of a composition adapted to inhibit migration of sulphur therethrough from the sulfur-containing rubber composition to the metal, and subjecting the assembled product to vulcanization temperatures.

2. In the art of making composite products of vulcanized rubber and a metal which combines with sulfur at vulcanization temperatures to form a metallic sulfide, the process which comprises coating the metal with a tough, tacky, heat-plastic rubber isomer, superposing thereon a sulfur-containing rubber composition with an intervening barrier layer of a composition capable of inhibiting migration of sulfur therethrough from the sulfur-containing rubber composition to the metal, and subjecting the assembled product to vulcanization temperatures.

3. The herein described method which comprises coating the surface of a metal with a tacky, heat-plastic rubber isomer, superposing thereon a sheet of a non-vulcanizable rubber composition, covering said sheet with a vulcanizable rubber composition, and subjecting the assembled product to vulcanizing temperatures.

4. An article composed of a sulfur-vulcanized rubber composition bonded to a metal reactive with sulphur, said metal having an adherent coating of a tough, heat-plastic isomer of rubber, and a layer between said coating and said vulcanized rubber composed of a composition capable of inhibiting during vulcanization migration of sulfur therethrough from the sulfur-containing rubber composition to the metal.

5. An article composed of a sulfur-vulcanized rubber composition bonded to metal through the intermediary of a coating of a tough heat-plastic isomer of rubber and a layer of rubber composition capable of inhibiting migration of sulfur therethrough from the sulfur-containing rubber composition to the metal.

In witness whereof I have hereunto set my hand this 8th day of June, 1927.

ALLAN B. MERRILL.